United States Patent [19]

Leprince et al.

[11] Patent Number: 4,698,822
[45] Date of Patent: Oct. 6, 1987

[54] APPARATUS FOR EXCITING A PLASMA IN A COLUMN OF GAS BY MEANS OF MICROWAVES, IN PARTICULAR FOR PROVIDING AN ION LASER

[75] Inventors: Philippe Leprince, Gif sur Yvette; Jean Marec, Boullay les Troux Limours; Serge Saada, Joinville le Pont; Emile Bloyet, Gif sur Yvette; Jacques Migne, Bretigny sur Orge, all of France

[73] Assignee: Centre National de la Recherche Scientifique (C.N.R.S.), Paris, France

[21] Appl. No.: 845,318

[22] Filed: Mar. 28, 1986

[30] Foreign Application Priority Data

Mar. 28, 1985 [FR] France ................ 85 04698

[51] Int. Cl.$^4$ ............................................. H01S 3/03
[52] U.S. Cl. .................................. 372/70; 372/61; 372/56; 372/64
[58] Field of Search ............... 372/70, 81, 35, 61, 372/23, 55, 56, 64

[56] References Cited

U.S. PATENT DOCUMENTS 3,493,845  2/1970  Bramley ........................ 332/7.51
3,753,149  8/1973  Kindl et al. .
4,477,907 10/1984  McMahan ........................ 372/64

FOREIGN PATENT DOCUMENTS 2290126  5/1976  France .
2346939 10/1977  France .

OTHER PUBLICATIONS

Moutoulas et al., "A High Frequency Surface Wave Pumped He-Ne Laser", Appl. Phys. Lett. 46(4), Feb. 15, 1985.
Bertrand et al., "Comparison of Two New Microwave Plasma Sources for HF Chemical Lasers", IEEE JQE vol. QE-14, No. 1, Jan. '78.
Kato et al., "Microwave Pulsed Excited Argon Ion Laser", Electronics & Comm. in Japan, vol. 55-c, No. 7, 1972.
Moisan et al., "Theory and Characteristics of an Efficient Surface Wave Launcher (Surfatron) Producing Long Plasma Columns", J. Phys. D. Appl. Phys., vol. 12, 1979.

Primary Examiner—Leon Scott, Jr.
Attorney, Agent, or Firm—Pollock, Vande Sande & Priddy

[57] ABSTRACT

A waveguide (130) is coupled to a tubular member (2) by a gap (139) suitable for generating an intense surface wave in a gaseous mixture contained in the tubular member (2). Short circuits (110 and 120) delimit the plasma, thereby generating very high intensity standing microwaves, which increase the energy density of the plasma. An ion laser effect can then be observed, in particular in a mixture of argon and helium, together with optional krypton.

19 Claims, 9 Drawing Figures

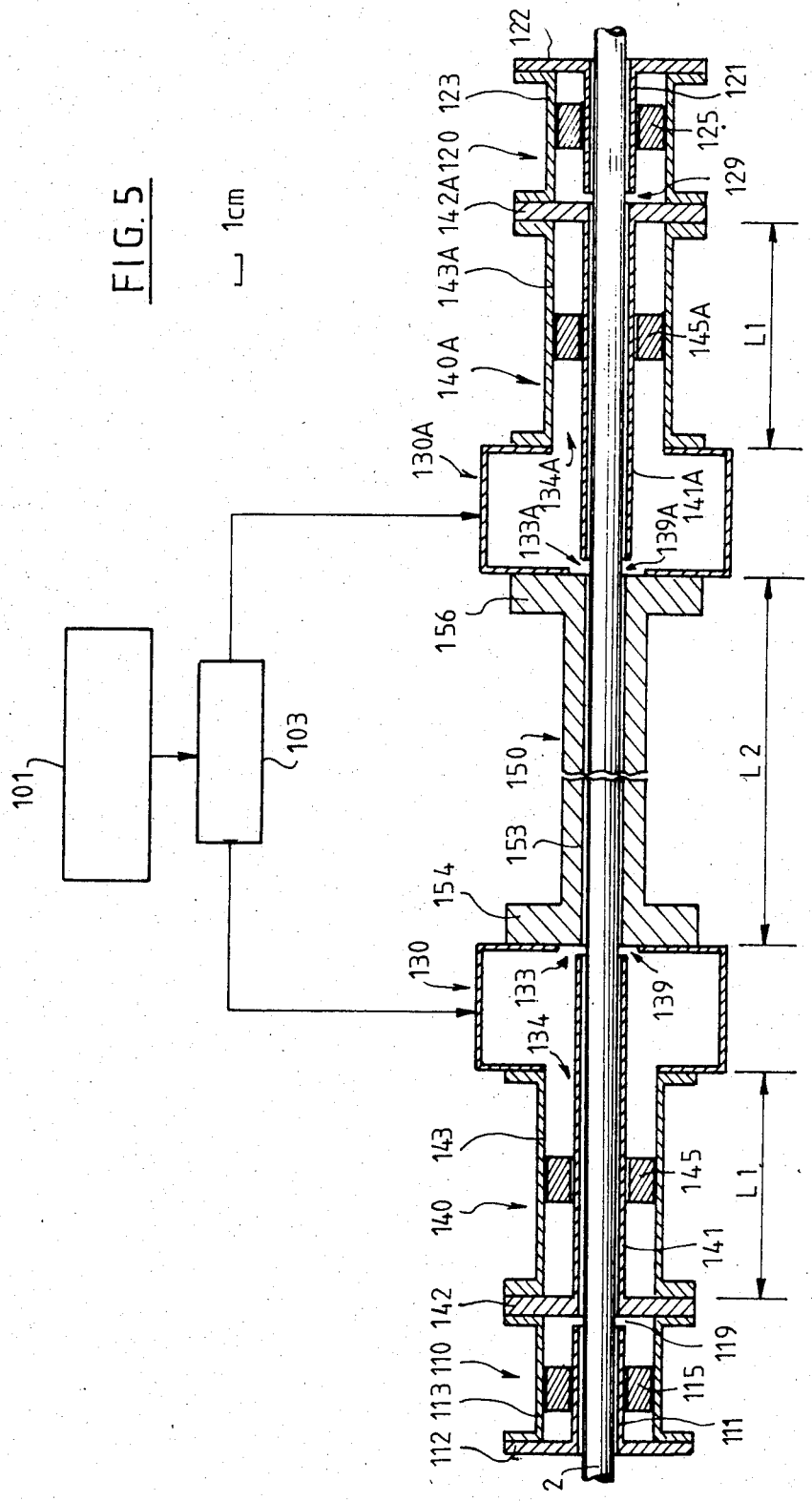

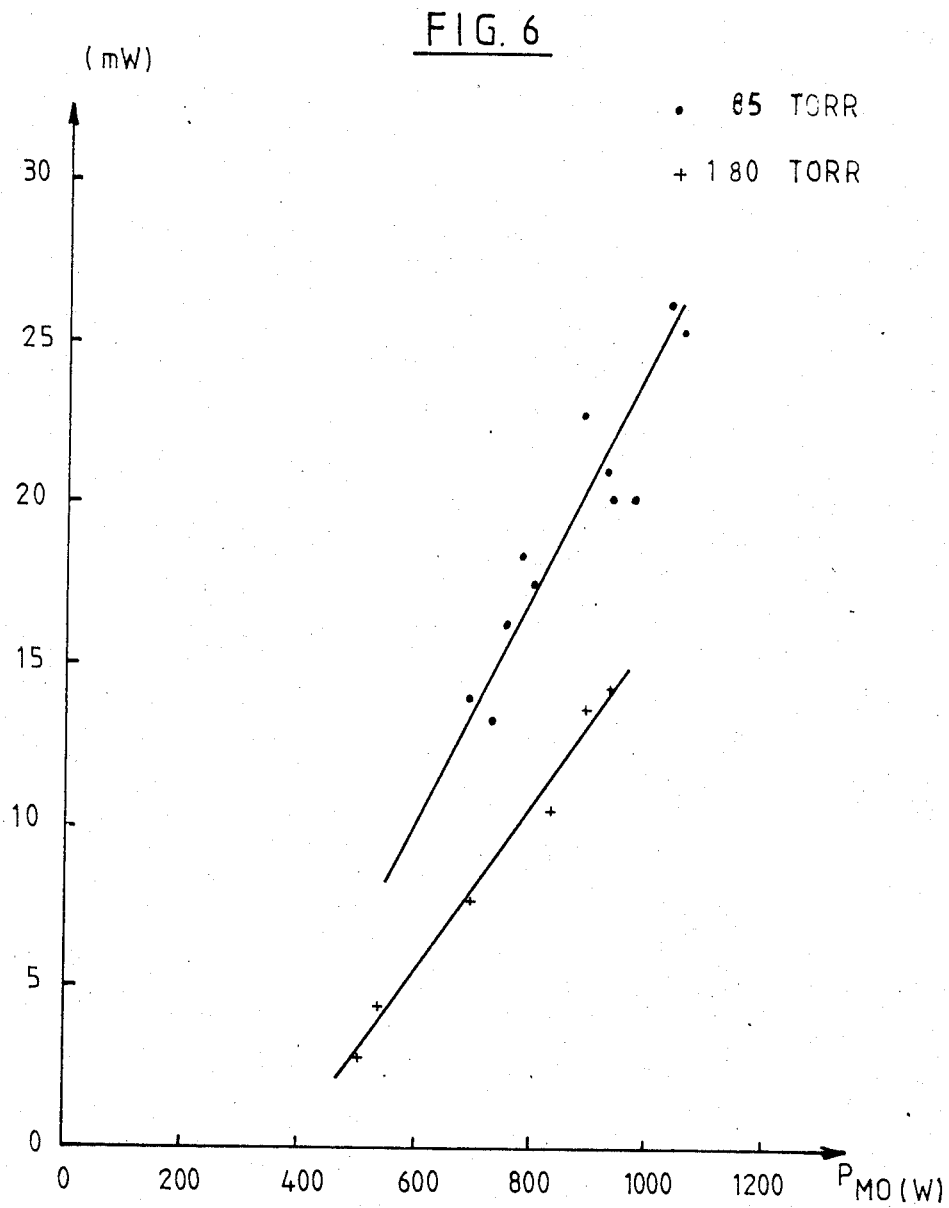

APPARATUS FOR EXCITING A PLASMA IN A COLUMN OF GAS BY MEANS OF MICROWAVES, IN PARTICULAR FOR PROVIDING AN ION LASER

The invention relates in a general manner to apparatus for exciting plasma in a column of gas by means of microwaves (preferably at a frequency greater than 100 MHz), and more particularly to a microwave-excited ion laser.

BACKGROUND OF THE INVENTION

French Pat. No. 74 36 378, published under No. 2 290 126, and its certificate of addition No. 75 33 425, published under No. 2 346 939, propose using microwaves to excite a plasma in a column of gas contained in an elongate tubular member.

Otherwise, although attempts have been made over a long period of time to obtain a laser effect in a gas excited by microwaves, such a laser effect has not been observed heretofore. This is in spite of the fact that much research has been directed towards obtaining a laser of sufficient power and longterm stability for the laser to be useful in industrial applications.

Preferred implementations of the present invention solve this problem.

This is achieved firstly by increasing the energy density provided by apparatus of the type described in the above-mentioned patent and certificate of addition, and secondly by providing an ion laser structure which is based on such apparatus, as a particular application of the invention.

The invention also makes new laser effects possible, concerning both the spectrum lines which are emitted and the relative powers of said lines. This is particularly true of a krypton-argon ion laser which emits both a red spectrum line and a blue spectrum line.

SUMMARY OF THE INVENTION

The present invention provides apparatus for exciting a plasma in a column of gas by means of microwaves, the apparatus being of the type comprising:

a tubular member suitable for containing said column of gas; and microwave-applying means surrounding said tubular member and coupled thereto via an annular gap suitable for creating an electric field at microwave frequency at the periphery of said tubular member, with the longitudinal and radial components of said electric field being suitable for exiting a plasma in said column of gas.

According to a first aspect of the invention, first and second microwave short circuits are provided at respective ends of said microwave-applying means, said short circuits being coupled to said tubular member and being adjusted to confine said plasma in that portion of said tubular member which extends between its couplings with said short circuits. The plasma, which is not uniform along the tubular member, then becomes the seat of very high intensity standing microwaves.

Under these conditions, it appears that the microwaves produced in the gas are essentially surface waves.

According to another aspect of the invention, the two ends of the tubular member are provided with respective transparent windows and are respectively equipped with mirrors suitable for longitudinally reflecting a large portion of the electromagnetic radiation related to at least one of the electron excitation spectrum lines in the gas contained in the tube, thereby obtaining a laser effect.

In practice, the tubular member comprises a capillary tube which flares at its ends towards said windows, while the intermediate portion thereof is surrounded by a coaxial annular duct which extends from at least one short circuit to the other and which has a cooling liquid flowing therethrough, such as a liquid having a low dielectric loss.

Advantageously, the cooling liquid is a silicone oil or a mixture of such oils.

In a particularly advantageous embodiment, the microwave-applying means comprise a waveguide having a microwave feed connection at one end, and tuning means such as a piston or plunger screw at its other end, with its intermediate portions including two side orifices suitable for passing said tubular member, together with means which define said annular gap for coupling said tubular member with said waveguide, said means being located close to one of said side orifices.

According to another aspect of the invention, said means defining an annular coupling gap comprise a conducting sheath which surrounds the tubular member from close to the inside of one of the side orifices in the waveguide to beyond the other side orifice, after which said sheath extends radially away from said tubular member and returns longitudinally to be connected to the side wall of said waveguide.

A moving conductor member may be provided for a adjustment purposes outside the waveguide between the central portion of said conductive sheath and its longitudinal return portion towards the wall of the waveguide.

According to another aspect of the invention, a conductive spacer is provided close to the side orifice of waveguide which creates the annular coupling gap, said spacer surrounding the tube up to the short circuit, thereby contributing to defining the desired microwave frequency electric field in said annular gap.

According to yet another aspect of the invention, the tubular member is made of a low dielectric loss machinable substance such as quartz, alumina, or beryllium oxide.

The apparatus may also include a plurality of microwave-applying means distributed along the tubular member between said two short circuits.

In an embodiment having a single microwave-applying means, the gas-containing tube has a useful portion which is about ten to a few tens of centimeters long and about one to a few millimeters in diameter.

The invention may be applied with gases or vapors in said tubular member which are suitable for fluorescing, or with mixtures thereof.

At present it is believed that at least one of the components of the gas must have an electron density of at least $10^{13}$ to $10^{14}$ electrons per cubic centimeter.

Thus, the gas(es) or vapor(s) may be chosen from substances in the group constituted by: argon, krypton, helium, neon (gases); and cadmium, gold, silver, copper (vapors).

Particularly advantageous operation has been obtained using a mixture of argon and helium, said mixture preferably comprising 40% to 75% helium, with best results being obtained at about 50% helium.

It has also been observed, that by adding a substantial quantity of krypton to the mixture, two laser effects may be simultaneously obtained at different wavelengths related to the electron excitation spectrum lines of argon (blue) and krypton (red).

BRIEF DESCRIPTION OF THE DRAWINGS

Embodiments of the invention are described by way of example with reference to the accompanying drawings, in which:

FIG. 5 shows a variant of the apparatus shown in FIGS. 3 and 4, which variant includes two microwave-applying means;

FIG. 6 is a graph showing laser power obtained as a function of microwave power absorbed.

MORE DETAILED DESCRIPTION

The mechanical portions of FIGS. 3, 4, 4A, and 5 are drawn to scale. The person skilled in the art is well aware of the great importance of the geometry of microwave apparatus. Consequently, these figures constitute an integral portion of the description and have the purpose of ensuring that the teaching of the invention to the person skilled in the art is complete, and also of assisting in the definition of the present invention.

Figure 1:
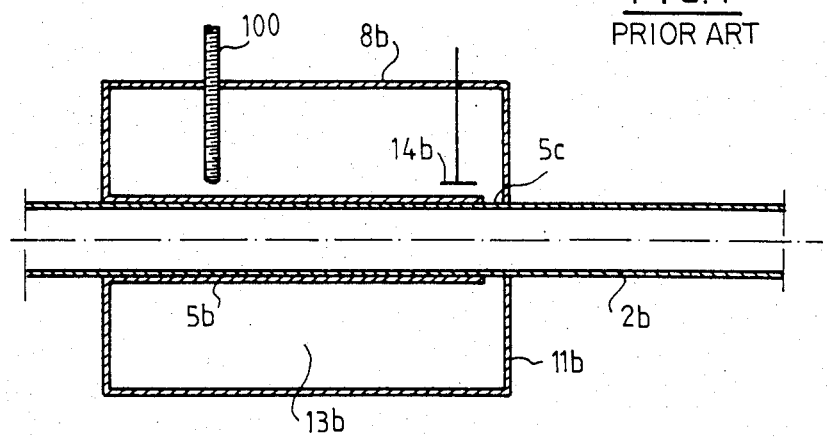
FIGS. 1, 2, and 2A are taken from French certificate of addition published under No. 2 346 939 and illustrate two variants of a prior art device for exciting a plasma in a column of gas by means of microwaves.

FIG. 1 shows a first embodiment of a prior art microwave-plasma excitor. It comprises a metal enclosure in the form of a coaxial structure together with a coupling member. The coaxial structure comprises a central tube $5b$ which is open at both ends and which surrounds a tubular member $2b$ made of quartz, for example. The structure further comprises a second tube $8b$ surrounding the tube $5b$ and coaxial therewith. One end of the tube $8b$ projects beyond the corresponding end of the tube $5b$. This end of the tube $8b$ is then closed by a metal wall $11b$ having a central opening through which the column $2b$ passes. Finally, the end of the tube $5b$ is separated from the wall $11b$ by a gap $5c$. The abovespecified French certificate of addition No. 2 346 939 provides for the wall $11b$ to be thinner than the other portions of the structure (and in particular than the tubes $5b$ and $8b$). A coupling member is also provided in the form of a metal plate $14b$ which is fed via a coaxial cable (which is preferably rigid) and which is located in the vicinity of the gap $5c$, but without overlapping said gap. Finally, the structure includes a tuning member which is illustrated in the present figure in the form of a plunger screw 100, i.e. an elongate metal conductor disposed radially in an adjustable manner relative to the quartz tubular member $2b$.

Although the apparatus shown in FIG. 1 serves to excite a plasma in a column of gas, it suffers from the drawback of operating with microwaves of relatively low frequency only, and at fairly low power.

Figure 2:
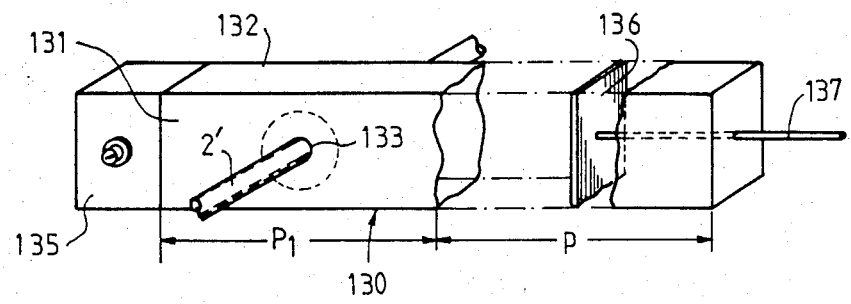

As shown in FIG. 2, this prior certificate of addition also describes a structure having a waveguide 130 of rectangular section, which waveguide may be a standard component, and having side walls 131 and 132 (the large sides) fitted with circular openings 133 and 134 for passing a glass tube 2' containing the column of gas to be excited. The guide per se is of length $p_1$ and has a transition 135 on one side enabling it to be fed from a coaxial cable (not shown). At its other end it is provided with a piston 136 which is displaceable by means of a guide rod 137 and is capable of moving over a length p.

Figure 2A:
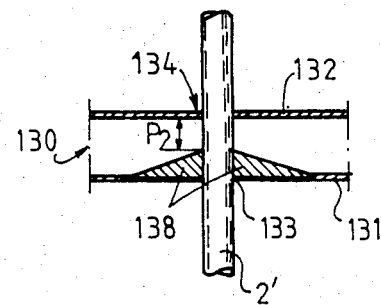

FIG. 2A shows the interior of the waveguide which is provided with a geenrally conical edge 138 for ensuring that the length $p_2$ over which the exciting electric field operates is small enough for it always to be less than the wavelength of the surface wave which the coupling may create.

The Applicant has discovered firstly that the efficiency with which microwaves are transferred from the microwaveapplying means to the tube can be considerably increased by changing the apparatuses described in said French certificate of addition No. 2 346 939 and its parent Pat. No. 2 290 126.

Figure 3:
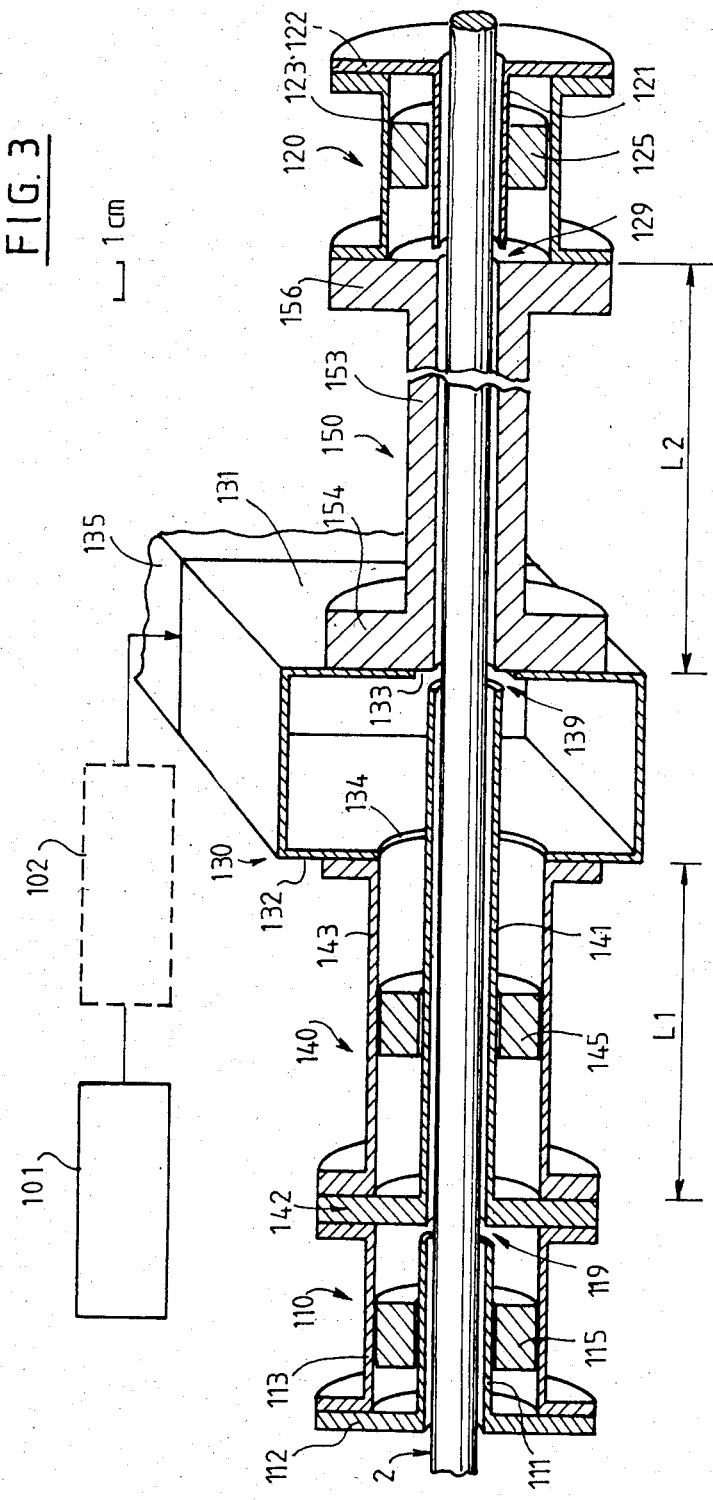
FIG. 3 is a perspective view in partial section showing a first embodiment of apparatus in accordance with the present invention.

FIG. 3 shows a first apparatus in accordance with the present invention.

This apparatus comprises microwave-applying means 130 which are somewhat similar to those shown in FIG. 2. The microwave feed transition 130 is excited from the microwave generator 101, optionally via measuring equipment 102 which may be constituted in whole or in part by the equipment described in the parent patent published under the No. 2 290 126, and in particular with reference to FIG. 4 thereof.

The side walls 131 and 132 or large sides of the waveguide are provided with respective orifices 133 and 134 which, unlike the apparatus shown in FIG. 2, are considerably larger than the tubular member 2 passing therethrough.

The front portion of the waveguide (not shown in FIG. 3) may include either a tuning system such as the piston 136 shown in FIG. 2, or else a short circuit located at the end of the waveguide which is then provided with one or more plunging adjusting screws as shown in FIG. 1. Such screws may also be placed between the microwave generator and the tubular member 2 in addition to the moving end piston.

The coupling coefficient between the waveguide 130 and the source is then greater than 90%, as shown by the measuring equipment 102.

The side opening 134 through the waveguide is larger than the other side opening 133. A conductive cylindrical sheath 141 passes coaxially therethrough and extends up to the vicinity of the other opening 133, whose diameter is slightly greater than the outside diameter of the sheath 141, in this case. A gap is thus provided for coupling the waveguide 130 to the tubular member 2.

The other end of the sheath 141 extends radially by means of a disk 142 and a longitudinal return member 143 extends in the opposite direction therefrom and comes into contact with the side wall 132 of the waveguide 130, level with the periphery of the opening 134. A moving member 145 may be used to establish contact in a selected longitudinal position between the inside portion 141 of said sheath and its return portion 143.

On the other side of the waveguide, a conductive spacer 150 is defined by a central conductive cylinder 153 fitted with end flanges 154 and 156 which project radially upwardly.

The flange 154 has an inside diameter which is smaller than the diameter of the opening 133, thereby contributing to the definition of the above-mentioned annular gap 139.

Finally, and in accordance with an important aspect of the present invention, microwave short circuits 110 and 120 made of the same material are provided at each end of the tubular member 2.

The short circuit 110 comprises an axial conductive cylinder 111 which defines a gap 119 relative to the above-mentioned disk 142. The other end of the cylinder 111 extends radially by means of a disk 112 and an annular connector 113 extends back from the disk 112 to come into contact with the disk 142. The adjustable short circuit is defined by a conductive member 115 which is movable between the parts 113 and 111, while making excellent electrical contact with both of them.

The structure of the short circuit 120 is symmetrical to that of the short circuit 110, and the reference numerals applied thereto are each greater than the corresponding reference numerals applied to the short circuit 110.

Finally, the length of the member 140 outside the waveguide 130 is referenced $L_1$ and the length of the spacer 150 is referenced $L_2$.

It has been experimentally observed that a plasma contained in apparatus as shown in FIG. 3 is not uniform along the tubular member, but rather is the seat of very high intensity standing microwaves, providing that the coupling between the guide 103 and the generator 101 is suitably adjusted by means of the above-mentioned piston or adjusting screw. Likewise the coupling between the waveguide and the tubular member 2 should be properly adjusted by setting the position of the moving conductor 145.

Figure 4:
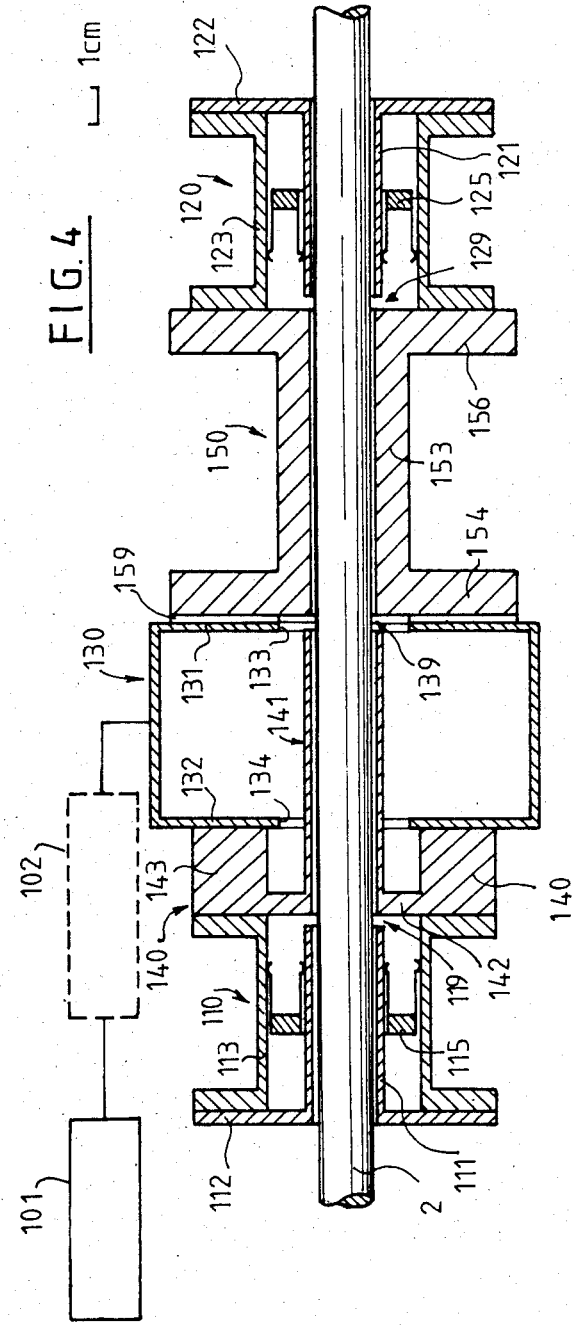
FIG. 4 shows a preferred variant of the FIG. 3 apparatus.
Figure 4A:
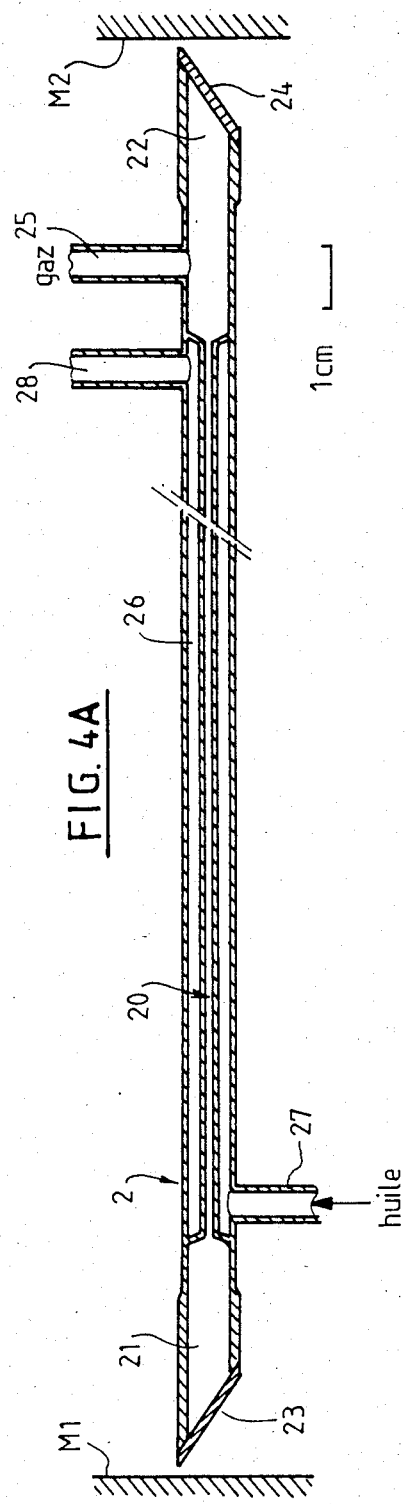
FIG. 4A shows how the tubular member (2) should be arranged to obtain laser operation.

A laser effect can then be observed given that the tubular member 2 has the structure shown in FIG. 4A and using a mixture of argon and helium as the gas.

After observing this laser effect, the applicant constructed apparatus as shown in FIG. 4. There are not very many differences in comparison with the FIG. 3 apparatus. Essentially, having determined the proper position for the moving short circuit 145, the FIG. 3 member 140 has been replaced by its useful portion, i.e. by a portion of reduced length which is located to the right of the short circuit 145 in the desired position thereof.

There are other detail differences between the apparatus shown in FIG. 3 and the apparatus shown in FIG. 4, namely:

the FIG. 4 apparatus has a shim 159 between the spacer 150 and the guide 130; and the FIG. 4 moving short circuits 115 and 125 are shown in greater detail, thereby revealing a plurality of angularly distributed highly conductive spring blades coming into contact with the parts 111 and 113 for the short circuit 110, and with the parts 121 and 123 for the short circuit 120.

Experiments were performed using a tubular member 2 made entirely out of quartz, and having the shape showing in FIG. 4A. The tube 20 per se has an inside diameter 1.5 mm and an outside diameter of 4 mm. It is surrounded by a further coaxial tube with an inside diameter of 10 mm and an outside diameter of 12 mm at least over its portion lying between the short circuits 110 and 120. A mixture of silicone oils is caused to flow along the annular space between the tubes for cooling purposes. It turns out that it is preferable to use a mixture of two types of oil, one of which is very fluid and the other of which is less fluid, with the two oils having different flash points. The resulting mixture can then have desired fluidity. Such a mixture can be obtained, in particular, using silicone oils sold by Rhone-Poulenc under the name 47.V.n, where n is a number indicating viscosity (n=10, 20, 30, . . .).

The ends of the central tube 20 are flared at 21 and 22 in order to be fitted with end pieces 23 and 24 disposed at the Brewster angle of incidence, with each end piece being fitted with a window which is glued thereto by molecular adherence.

Finally, mirrors M1 and M2 are placed at the ends of the tube in order to reflect the major portion of the radiation along the axis of the tube in the conventional laser manner.

The apparatus was set up as follows:

firstly the coupling between the generator 101 and the waveguide 130 was adjusted as described above; and secondly the short circuits 110 and 120 were adjusted to confine the plasma between the two coupling orifices 119 and 129 of these short circuits with the tube. The length of the plasma was then about 14 centimeters, with FIG. 4A being drawn to scale.

Tests were then performed with the tube being filled at various pressures lying in the range 0.7 Torr to 2 Torr, and using various argon-helium mixtures in which the volume percentage of helium was varied over the range 40% to 75%.

The applied microwave power was varied over the range 200 watts to 1.5 kilowatts.

Finally, three types of laser mirror were used, namely:

Rmax=99.6%, RC=1.20 meters;
Rmax=98.4%, RC=1.20 meters; and
Rmax=95.7%, RC=2.00 meters;

where Rmax designates the maximum reflection coefficient of the mirror and RC its radius of curvature.

The length of the optical cavity thus obtained was about 70 centimeters.

Argon laser spectrum rays were then observed at the following wavelengths:

457.9 nanometers;
476.5 nanometers;
488.0 nanometers;
496.5 nanometers; and
514.5 nanometers.

FIG. 6 is a graph showing two curves of laser power obtained plotted in milliwatts (long pulses) as a function of the applied microwave power in watts, with the two curves corresponding to two different filling pressures, namely 0.85 Torr (points marked as dots) and 1.3 Torr (points marked as crosses).

It turns out that a stable and uniform laser discharge can be obtained in a mixture of argon and helium, and in a surprising manner that the fact of adding helium at constant total pressure gives rise to increasing laser power with the best mixture being a mixture which contains 50% helium by volume.

By adding krypton to the mixture (with a volume proportion of 40% helium, 30% argon, and 30% krypton, for example), krypton laser spectrum lines have also been observed at 476.2 nanometers and at 528.0 nanometers.

By using other mirrors, more intense krypton spectrum lines have been obtained in the red, namely at 647.1 nanometers and at 676.4 nanometers.

All of the above experiments were performed using a microwave apparatus operating at 2,450 Megahertz.

It appears that this apparatus excites a surface microwave in the gas giving rise to a very high intensity plasma. The intensity of this plasma appears to be sufficient to produce a laser effect in the gas contained in the tubular member 2.

In order to observe this effect, particular attention must be applied to the annular coupling gap 139 between the waveguide 130 and tubular member 2.

Figure 7:
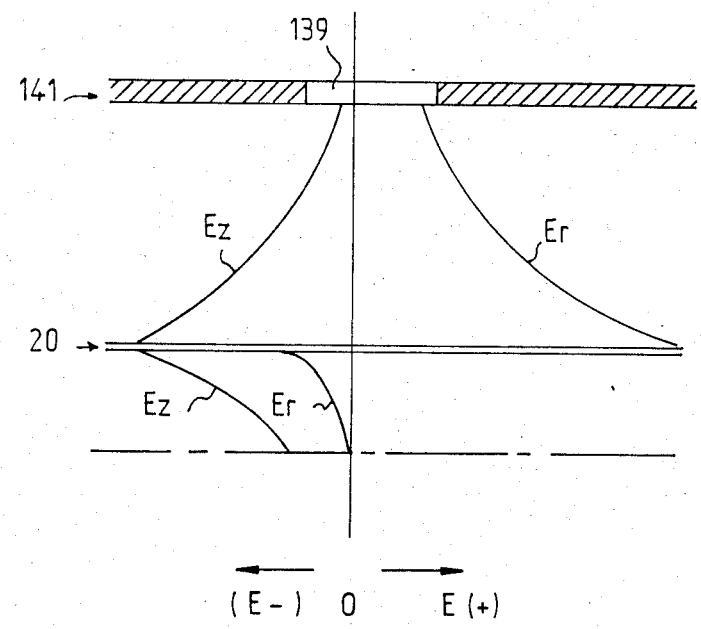
FIG. 7 is a diagram showing the radial and longitudinal components of the electric field.

FIG. 7 is a diagram showing the shape of the electric field required at this point, and in particular showing the radial component $E_r$ and the longitudinal component $E_z$ thereof.

FIG. 7 shows the coupling orifice 139 through the wall which is given the overall reference 141. The outer periphery 20 of the capillary tube containing the gas to be excited is also shown.

It may initially be observed that the longitudinal component $E_z$ is continuous where it passes through the central capillary tube 20. In contrast, the radial component $E_r$ is discontinuous by virtue of passing from a positive dielectric constant to a highly negative dielectric constant as associated with a plasma.

It may be observed, in particular, that an electric field is required at microwave frequencies which is mainly radial level with the orifice 139 in order to obtain a field which is essentially longitudinal in the center of the tube 20, where the radial field is substantially zero by virtue of symmetry.

In the above experiments, the central capillary tube 20 was closed. After being evacuated, it was filled to a desired total pressure of the selected mixture. Naturally, a variant of the invention consists in causing a mixture of gas to flow along the tube 20 at some desired pressure.

Further, instead of using a quartz tubular member 2, an alumina or a beryllium oxide member may be used instead.

In order to increase the power applied to the gas column, use may be made of a variant apparatus as shown in FIG. 5. This apparatus differs relatively little from that shown in FIG. 3. The main difference lies in a second microwave-applying means being inserted between the flange 156 on the spacer 150 and the end short circuit 20. This microwave-applying means 130A is identical with the waveguide 130 and is fitted with an adjusting member 140A which is identical with the member 140 and which is symmetrically disposed relative thereto.

The two waveguides 130 and 130A may be fed from a common generator 101 via a 3 dB coupler 103, or else they may be fed from two different generators which are caused to operate at the same frequency. A laser effect has also been observed from apparatus of this type. It appears that under these conditions, the plasma is the seat of a composition of high intensity standing microwaves.

The Applicant is presently of the opinion that apparatus in accordance with the invention is capable of operating over a wide variety of gases or vapors capable of fluorescing, and also with a wide variety of mixtures thereof.

At present, it appears that an important requirement is that at least one of the components of the gas used should have an electron density of not less than $10^{13}$ to $10^{14}$ electrons per cubic centimeter.

Suitable gases include argon, helium, krypton, and neon at pressures lying the range of a fraction of the Torr to several tens of Torr, with pressures in the range 1 Torr to 10 Torr being preferred.

Various metal vapors may also be used, for example vapors of cadmium, gold, silver, and copper.

In FIGS. 3 to 5, the conductive portions of the apparatus are made of brass, and they are preferably coated on the inside with a thin of layer of gold. Naturally, this applies to the end short circuits which are quarter-wave traps. The dimensions, and in particular $L_1$ and $L_2$, may be increased by an integer number of half-waves, given that on each occasion that is the length of the guided wave, as it appears in the tubular member.

Furthermore, the teaching of FIG. 5 may be extended to a higher number of microwave-applying means, suitably distributed at half-wave length intervals along a tubular member.

There are several applications in which the possibility of obtaining a laser which operates simultaneously in the blue and the red regions of the spectrum (as can be obtained in accordance with the invention using mixtures containing both argon and helium, inter alia) is most advantageous, and in particular: laser printing or copying, and ophthalmological use of a laser on the retina.

We claim:

1. An apparatus for exciting a plasma in a waveguide having a column of gas by means of microwaves, the apparatus being of the type comprising:

a tubular member suitable for containing said column of gas; and microwave-applying means surrounding said tubular member and coupled thereto via an annular gap suitable for generating electric field at microwave frequency at the periphery of said tubular member, with longitudinal and radial components of said electric field exciting a plasma in said column of gas;

said apparatus including the improvement that first and second microwave short circuits are provided at respective ends of said microwave-applying means, said short circuits being coupled to said tubular member and being adjusted to confine said plasma in that portion of said tubular member which extends between its couplings with said short circuits;

the plasma which is not uniform along the tubular member then becoming the seat of very high intensity standing microwaves.

2. Apparatus according to claim 1, wherein the microwaves produced in the gas are surface waves.

3. Apparatus according to claim 1, wherein each end of the tubular member is provided with a transparent window, and also with a mirror suitable for longitudinally reflecting a major portion of the electromagnetic radiation associated with at least one electron excitation spectrum line of the gas contained in said tube, thereby producing a laser effect.

4. Apparatus according to claim 3, wherein the tubular member comprises a capillary tube which is flared at its ends towards said windows, said tubular member also including an intermediate portion that is surrounded by a coaxial annular duct extending at least between said short circuits, said duct having a low dielectric loss liquid cooling fluid flowing therein, e.g.

5. Apparatus according to claim 4, wherein the cooling fluid is a silicone oil or a mixture of such oils.

6. Apparatus according to claim 1, wherein the microwaveapplying means is provided at one end with a microwave feed connection and at its other end with a tuning member, said microwave applying means further including an intermediate portion having two side orifices through which the tubular member can pass, together with means defining said annular gap for coupling the tubular member with said waveguide, said means being located close to one of said side orifices.

7. Apparatus according to claim 6, wherein the means defining the annular coupling gap comprise a conductive sheath which surrounds the tubular member from close to the inside of one of the side orifices through the waveguide to beyond the other side orifice, after which said sheath extends radially away from the tubular member and then returns longitudinally to be connected to the side wall of the waveguide.

8. Apparatus according to claim 7, in which a moving conductive member is provided outside said waveguide between the central portion of said conductive sheath and its longitudinal return portion towards the wall of said waveguide.

9. Apparatus according to claim 6, 7, or 8, in which a conductive spacer is provided on one side of that side orifice of the waveguide which provides the annular coupling space, said conductive spacer surrounding the tube up to the short circuit and contributing to establishing a desired microwave electric field in said annular space.

10. Apparatus according to claim 1, wherein the tubular member is made of a low dielectric loss machinable substance such as quartz, alumina, or beryllium oxide.

11. Apparatus according to claim 1, including a plurality of microwave-applying means distributed along the tubular member between said two short circuits.

12. Apparatus according to claim 1, wherein the gas-containing tube has a useful portion whose length lies in a range from about 10 centimeters to a few tens of centimeters, and whose diameter lies in the range from about 1 millimeter to a few millimeters.

13. Apparatus according to claim 3, wherein the tubular member contains or passes a column of gas or vapor suitable for fluorescing, or a mixture of such gases or vapors.

14. Apparatus according to claim 13, wherein at least one the components of the gas has an electron density of not less than $10^{13}$ to $10^{14}$ electrons per cubic centimeter.

15. Apparatus according to claim 13, wherein the gas(es) or vapor(s) are chosen from substances in the group constituted by: argon, krypton, helium, neon gases; and cadmium, gold, silver, copper vapors.

16. Apparatus according to claim 15, wherein the gas is a mixture of argon and helium.

17. Apparatus according to claim 16, wherein the said mixture comprises 40% to 75% helium.

18. Apparatus according to claim 17; wherein said mixture comprises 50% helium and 50% argon.

19. Apparatus according to claim 16, wherein the mixture includes a substantial quantity of krypton, thereby enabling lasing to occur at different wavelengths, related to the electron excitation spectrum lines of argon and of krypton respectively.

* * * * *